US010139495B2

(12) United States Patent
Payne

(10) Patent No.: US 10,139,495 B2
(45) Date of Patent: Nov. 27, 2018

(54) SHELVING AND PACKAGE LOCATING SYSTEMS FOR DELIVERY VEHICLES

(71) Applicant: Hand Held Products, Inc., Fort Mill, SC (US)

(72) Inventor: Gregory Payne, Charlotte, NC (US)

(73) Assignee: Hand Held Products, Inc., Fort Mill, SC (US)

(*) Notice: Subject to any disclaimer, the term of this patent is extended or adjusted under 35 U.S.C. 154(b) by 132 days.

(21) Appl. No.: 14/590,024

(22) Filed: Jan. 6, 2015

(65) Prior Publication Data
US 2015/0210199 A1    Jul. 30, 2015

Related U.S. Application Data

(60) Provisional application No. 61/931,260, filed on Jan. 24, 2014.

(51) Int. Cl.
| B60P 1/64 | (2006.01) |
| G01S 19/13 | (2010.01) |
| G01S 19/14 | (2010.01) |
| G08G 1/00 | (2006.01) |
| G06Q 10/08 | (2012.01) |
| B60P 3/00 | (2006.01) |

(52) U.S. Cl.
CPC ............ *G01S 19/14* (2013.01); *B60P 3/007* (2013.01); *G06Q 10/08* (2013.01); *G08G 1/205* (2013.01)

(58) Field of Classification Search
CPC .. B60P 1/64; B60P 3/007; G01S 19/13; G01S 19/14; G06Q 10/047; G06Q 50/28
See application file for complete search history.

(56) References Cited

U.S. PATENT DOCUMENTS

| 5,671,362 A | 9/1997 | Cowe et al. |
| 6,832,725 B2 | 12/2004 | Gardiner et al. |
| 7,128,266 B2 | 10/2006 | Marlton et al. |
| 7,159,783 B2 | 1/2007 | Walczyk et al. |

(Continued)

FOREIGN PATENT DOCUMENTS

| EP | 1300348 A1 | 4/2003 |
| WO | 2008/107123 A1 | 9/2008 |

(Continued)

OTHER PUBLICATIONS

Combined Search and Exam Report in Related GB Application No. 1500926.9, dated Jul. 1, 2015, 6 pages.

(Continued)

*Primary Examiner* — Thomas G Black
*Assistant Examiner* — Ce Li Li
(74) *Attorney, Agent, or Firm* — Additon, Higgins & Pendleton, P.A.

(57) ABSTRACT

A shelving and package locating system for delivery vehicles includes one or more shelves for storing packages within a package-delivery vehicle during delivery. Each package is associated with both a geographic delivery address and an assigned location on a particular shelf within the package-delivery vehicle. A GPS unit determines the location of the package-delivery vehicle during delivery, and a computer provides the shelf location of a particular package when that package's delivery-location information substantially corresponds to vehicle-location information.

15 Claims, 5 Drawing Sheets

SYSTEM OF ADJUSTABLE BINS TO IDENTIFY PACKAGE LOCATIONS

(56) References Cited

U.S. PATENT DOCUMENTS

| | | | |
|---|---|---|---|
| 7,413,127 B2 | 8/2008 | Ehrhart et al. | |
| 7,561,533 B2 | 7/2009 | Aklepi et al. | |
| 7,726,575 B2 | 6/2010 | Wang et al. | |
| 8,210,430 B1 * | 7/2012 | Grant | G06Q 10/087 235/383 |
| 8,294,969 B2 | 10/2012 | Plesko | |
| 8,317,105 B2 | 11/2012 | Kotlarsky et al. | |
| 8,322,622 B2 | 12/2012 | Suzhou et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,736,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Baden | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Bremer et al. | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |
| 8,939,374 B2 | 1/2015 | Jovanovski et al. | |
| 8,942,480 B2 | 1/2015 | Ellis | |

(56) References Cited

U.S. PATENT DOCUMENTS

| | | |
|---|---|---|
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,134,426 B1 | 9/2015 | Siris |
| 9,684,730 B1 | 6/2017 | Grant |
| 2003/0036985 A1 | 2/2003 | Soderholm |
| 2004/0004119 A1* | 1/2004 | Baldassari ............... B07C 3/10 235/384 |
| 2004/0153207 A1* | 8/2004 | Peck ...................... B65G 1/137 700/214 |
| 2004/0202154 A1* | 10/2004 | Aklepi .................. G06Q 10/08 370/352 |
| 2005/0043886 A1* | 2/2005 | Stevens ............. G08G 1/096811 701/469 |
| 2005/0083213 A1* | 4/2005 | Stevens ................ G06Q 10/047 340/994 |
| 2005/0137933 A1 | 6/2005 | Holsen et al. |
| 2005/0175441 A1* | 8/2005 | Liberman ............ A47G 29/141 414/807 |
| 2007/0050271 A1 | 3/2007 | Ufford et al. |
| 2007/0063048 A1 | 3/2007 | Havens et al. |
| 2007/0129842 A1* | 6/2007 | Perez ........................ B07C 3/14 700/213 |
| 2007/0188324 A1* | 8/2007 | Ballin .................... G06Q 10/08 340/572.1 |
| 2008/0169977 A1* | 7/2008 | Payne .................. G01S 5/0009 342/357.52 |
| 2008/0183328 A1 | 7/2008 | Danelski |
| 2009/0099943 A1 | 4/2009 | Bodin et al. |
| 2009/0134221 A1 | 5/2009 | Zhu et al. |
| 2009/0322486 A1 | 12/2009 | Gerstel |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0112979 A1* | 5/2011 | Holsen .................. G06Q 10/08 705/338 |
| 2011/0148750 A1* | 6/2011 | Ayala .................... G06F 3/147 345/107 |
| 2011/0169999 A1 | 7/2011 | Grunow et al. |
| 2011/0202554 A1 | 8/2011 | Powilleit et al. |
| 2011/0202591 A1 | 8/2011 | Reis et al. |
| 2012/0029764 A1* | 2/2012 | Payne .................. G07C 5/0891 701/33.4 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0179306 A1* | 7/2013 | Want .................. G06Q 20/3278 705/26.81 |
| 2013/0235206 A1 | 9/2013 | Smith et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |

(56) References Cited

U.S. PATENT DOCUMENTS

| | | |
|---|---|---|
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201041 A1 | 7/2014 | Meyer |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/519,179 for Dimensioning System With Multipath Interference Mitigation filed Oct. 21, 2014 (Thuries et al.); 30 pages.

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

(56) References Cited

OTHER PUBLICATIONS

U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Hejl); 38 pages.
U.S. Appl. No. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User'S Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User'S Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Pat. Appl. No. 13/367,978, filed Feb. 7, 2012, (Feng et al.); now abandoned.
U.S. Appl. No. 14/462,801 for Mobile Computing Device With Data Cognition Software, filed Aug. 19, 2014 (Todeschini et al.); 38 pages.
U.S. Appl. No. 14/724,134 for Electronic Device With Wireless Path Selection Capability filed May 28, 2015 (Wang et al.); 42 pages.
U.S. Appl. No. 14/277,337 for Multipurpose Optical Reader, filed May 14, 2014 (Jovanovski et al.); 59 pages.
U.S. Patent Application No. 14/200,405 for Indicia Reader for Size-Limited Applications filed Mar. 7, 2014 (Feng et al.); 42 pages.
U.S. Appl. No. 14/724,849 for Method of Programming the Default Cable Interface Software in an Indicia Reading Device filed May 29, 2015 (Barten); 29 pages.
U.S. Appl. No. 14/446,391 for Multifunction Point of Sale Apparatus With Optical Signature Capture filed Jul. 30, 2014 (Good et al.); 37 pages.
U.S. Appl. No. 14/722,608 for Interactive User Interface for Capturing a Document in an Image Signal filed May 27, 2015 (Showering et al.); 59 pages.
U.S. Appl. No. 29/528,890 for Mobile Computer Housing filed Jun. 2, 2015 (Fitch et al.); 61 pages.
U.S. Appl. No. 14/614,796 for Cargo Apportionment Techniques filed Feb. 5, 2015 (Morton et al.); 56 pages.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 14/578,627 for Safety System and Method filed Dec. 22, 2014 (Ackley et al.); 32 pages.
U.S. Appl. No. 14/573,022 for Dynamic Diagnostic Indicator Generation filed Dec. 17, 2014 (Goldsmith); 43 pages.
U.S. Appl. No. 14/724,908 for Imaging Apparatus Having Imaging Assembly filed May 29, 2015 (Barber et al.); 39 pages.
U.S. Appl. No. 14/519,195 for Handheld Dimensioning System With Feedback filed Oct. 21, 2014 (Laffargue et al.); 39 pages.
U.S. Appl. No. 14/519,211 for System and Method for Dimensioning filed Oct. 21, 2014 (Ackley et al.); 33 pages.
U.S. Appl. No. 14/519,233 for Handheld Dimensioner With Data-Quality Indication filed Oct. 21, 2014 (Laffargue et al.); 36 pages.
U.S. Appl. No. 14/679,275 for Dimensioning System Calibration Systems and Methods filed Apr. 6, 2015 (Laffargue et al.); 47 pages.
U.S. Appl. No. 14/744,633 for Imaging Apparatus Comprising Image Sensor Array Having Shared Global Shutter Circuitry filed Jun. 19, 2015 (Wang); 65 pages.

(56) References Cited

OTHER PUBLICATIONS

U.S. Appl. No. 29/528,590 for Electronic Device filed May 29, 2015 (Fitch et al.); 9 pages.

U.S. Appl. No. 14/519,249 for Handheld Dimensioning System With Measurement-Conformance Feedback filed Oct. 21, 2014 (Ackley et al.); 36 pages.

U.S. Appl. No. 14/744,836 for Cloud-Based System for Reading of Decodable Indicia filed Jun. 19, 2015 (Todeschini et al.); 26 pages.

U.S. Appl. No. 14/398,542 for Portable Electronic Devices Having a Separate Location Trigger Unit for Use in Controlling an Application Unit filed Nov. 3, 2014 (Bian et al.); 22 pages.

U.S. Appl. No. 14/405,278 for Design Pattern for Secure Store filed Mar. 9, 2015 (Zhu et al.); 23 pages.

U.S. Appl. No. 14/745,006 for Selective Output of Decoded Message Data filed Jun. 19, 2015 (Todeschini et al.); 36 pages.

U.S. Appl. No. 14/568,305 for Auto-Contrast Viewfinder for an Indicia Reader filed Dec. 12, 2014 (Todeschini); 29 pages.

U.S. Appl. No. 29/526,918 for Charging Base filed May 14, 2015 (Fitch et al.); 10 pages.

U.S. Appl. No. 14/580,262 for Media Gate for Thermal Transfer Printers filed Dec. 23, 2014 (Bowles); 36 pages.

U.S. Appl. No. 14/590,024 for Shelving and Package Locating Systems for Delivery Vehicles filed Jan. 6, 2015 (Payne); 31 pages.

U.S. Appl. No. 29/519,017 for Scanner filed Mar. 2, 2015 (Zhou et al.); 11 pages.

U.S. Appl. No. 14/748,446 for Cordless Indicia Reader With a Multifunction Coil for Wireless Charging and EAS Deactivation, filed Jun. 24, 2015 (Xie et al.); 34 pages.

U.S. Appl. No. 14/529,857 for Barcode Reader With Security Features filed Oct. 31, 2014 (Todeschini et al.); 32 pages.

U.S. Appl. No. 29/528,165 for In-Counter Barcode Scanner filed May 27, 2015 (Oberpriller et al.); 13 pages.

U.S. Appl. No. 14/662,922 for Multifunction Point of Sale System filed Mar. 19, 2015 (Van Horn et al.); 41 pages.

U.S. Appl. No. 14/596,757 for System and Method for Detecting Barcode Printing Errors filed Jan. 14, 2015 (Ackley); 41 pages.

U.S. Appl. No. 14/533,319 for Barcode Scanning System Using Wearable Device With Embedded Camera filed Nov. 5, 2014 (Todeschini); 29 pages.

Extended European Search Report in related European Application No. 16198998.3 dated Feb. 27, 2017, pp. 1-7 [U.S. Publication No. 2015/0210199, which is cited in Search Report, is the publication of the present application.].

Office Action in Related GB Application No. 1500926.9, dated Jul. 11, 2017, 7 pages.

Examination Report in Related GB Application No. 1500926.9, dated Mar. 29, 2018, 6 pages.

Extended European Search Report in related European Application No. 18151836.6 dated Mar. 26, 2018, pp. 1-10 [U.S. Publication Nos. 2015/0210199; 20070050271; 2009/0099943; 2014/0201041 and U.S. Pat. No. 5,671,362 previously cited.].

\* cited by examiner

SYSTEM OF ADJUSTABLE BINS TO IDENTIFY
PACKAGE LOCATIONS

FLEXIBLE AND FOLDABLE

ROLLER TRACKS AND FRONT RETAINER

PUSH FEED SYSTEM TO KEEP PACKAGES FORWARD

SHELVING AND PACKAGE LOCATING SYSTEMS FOR DELIVERY VEHICLES

CROSS-REFERENCE TO RELATED APPLICATION

The present application claims the benefit of U.S. patent application Ser. No. 61/931,260 for Shelving and Package Locating Systems for Delivery Vehicles filed Jan. 24, 2014. The foregoing patent application is hereby incorporated by reference in its entirety.

FIELD OF THE INVENTION

The present invention relates to the field of package or parcel delivery and, more specifically, to shelving and package locating systems for package-delivery vehicles.

BACKGROUND

Generally speaking, packages that have been loaded onto a delivery vehicle (e.g., a panel-type delivery van) are often difficult to locate when it is time to unload the packages for delivery. As a result, delivery drivers may spend a significant amount of unproductive time searching for the correct package or group of packages when at a delivery location. The time spent searching for packages is not only unproductive; it also results in increased fuel costs if the delivery vehicle is left idling.

When sorted and prepared for delivery the packages are typically classified based upon their specific delivery location, assigned to a delivery route, and loaded onto a delivery vehicle either by a sorter or by a delivery driver. The delivery vehicles may have two or three lengthwise shelves along each wall of the delivery vehicle. The sorters or drivers may attempt to load the packages into the delivery vehicle based upon the route and the order of scheduled stops in order to make locating the packages easier when at a delivery location. The sorters may also try to keep packages scheduled for delivery to the same customer together in the delivery vehicle for convenience.

Many times, however, it is difficult or otherwise impractical to keep related packages together during delivery due to the size of the overall load in the vehicle or the size of the respective individual packages. Experienced sorters may assist the delivery drivers by physically writing customer names on the packages for easy visual identification, but this is not a standard practice.

Further, because sorter turn-over is high, delivery drivers will often have to check or reorganize the package load based upon their delivery route. For some parcel delivery companies, however, only the delivery drivers load the packages, whereas sorters simply move the assigned packages behind the respective delivery trucks.

Additionally, packages may become misplaced during transport. During travel, packages can shift or otherwise fall off of a shelf. When the packages are picked up and re-shelved after they have fallen, the packages may not be placed in a convenient location for easy access during delivery stops.

Therefore, a need exists for improved shelving systems for package-delivery vehicles so that packages can be more effectively loaded and so that the packages are easier to locate at the time of delivery.

SUMMARY

Accordingly, in one aspect, the present invention embraces a shelving and package locating system for a package-delivery vehicle (e.g., a delivery truck). In this regard, the system can include one or more shelves for storing packages (e.g., goods or parcels) within the package-delivery vehicle as packages are in transit during delivery. Typically, each package is associated with both a geographic delivery address (i.e., delivery-location information or delivery-address information) and an assigned location on a particular shelf within the package-delivery vehicle (i.e., shelf-location information). The shelf-location information may be input into a computer (e.g., using an indicia-reading device). The system also includes a GPS unit for detecting or otherwise determining the location of the package-delivery vehicle during delivery (e.g., while the driver of a delivery truck is driving a predetermined delivery route). The system also includes a computer (e.g., a central processing unit and an associated memory) that is configured to provide the shelf location of a particular package (i.e., the shelf-location information) when that package's delivery-location information substantially matches the vehicle-location information.

In another aspect, the present invention embraces a shelving system for a package-delivery vehicle for storing packages during delivery to respective geographic locations. Each package is associated with corresponding delivery-location information. An indicia-reader may be used to scan packages that are loaded onto the shelves, associate each package with its respective shelf location, and transmit the corresponding shelf-location information. A GPS receiver can determine the location of the package-delivery vehicle and transmit the corresponding vehicle-location information. A computer is in communication with the indicia-reading device and the GPS receiver. The computer's central processing unit can be configured to receive shelf-location information from the indicia-reading device for packages that have been loaded onto the package-delivery vehicle's shelves and vehicle-location information from the GPS receiver. The computer's central processing unit can be configured to analyze vehicle-location information, delivery-location information, and shelf-location information. The central processing unit can provide the shelf location of a package when that package's delivery-location information corresponds with vehicle-location information.

In yet another aspect, the present invention embraces a method for delivering packages. A number of packages that are scheduled for delivery may be provided with each package having a corresponding delivery address. Each package may be assigned a shelf location within a delivery vehicle. The geographic location of the delivery vehicle can be monitored and a delivery person automatically notified of the shelf location of a package when a package's delivery address substantially corresponds with the geographic location of the delivery vehicle.

In yet another aspect, the present invention embraces a modular shelving system. The system may include a track system affixed to an internal wall of the package-delivery vehicle. An adjustable shelf can be moveably connected to the track system. The adjustable shelf can slide laterally along the track system and fold up and down with respect to the track system.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces shelving and package locating systems for package-delivery vehicles (e.g., a delivery truck). In particular, the present invention embraces improved shelving systems for package-delivery vehicles so that packages are easier to locate at the time of delivery.

Typical vehicles that may employ shelving systems according to the present invention include, without limitation, panel-van delivery vehicles such as the kind used by commercial parcel carriers (e.g., UPS, FedEx, and DHL Express). References in the disclosure to particular kinds of vehicles are not intended to limit the disclosure to any kind of particular vehicle or container that may be used to ship or otherwise deliver packages (e.g., vans, box trucks, semi-trailers, etc.).

Further, although shelving systems are referred to herein, the term "shelving" is used in a general sense and is not limited simply to the shelving rows that may typically be used within panel-van type delivery vehicles. Those having skill in the art will recognize that the system of the present invention may be used with any kind of unit that may be used in shipping (e.g., cargo containers, stacking bins, shelf bins, straight-wall containers, stack and nest containers, divided boxes, etc.).

In sum, an exemplary system according to the present invention may include one or more shelves for storing packages within a package-delivery vehicle (e.g., as the packages are in transit during delivery). Typically, each package is associated with both a geographic address for delivery (i.e., delivery-location information) and an assigned location on a particular shelf within the package-delivery vehicle (i.e., shelf-location information). The system includes a GPS unit for detecting or otherwise determining the location of the package-delivery vehicle during delivery (e.g., while the driver of a delivery truck is driving a predetermined delivery route). The system further includes a computer (e.g., a central processing unit and an associated memory) that is configured to provide the shelf location of a particular package (i.e., the shelf-location information) to a delivery driver when that package's delivery-location information is within a specified range of the vehicle-location (i.e., when the delivery vehicle is close to the delivery stop).

Figure 1:
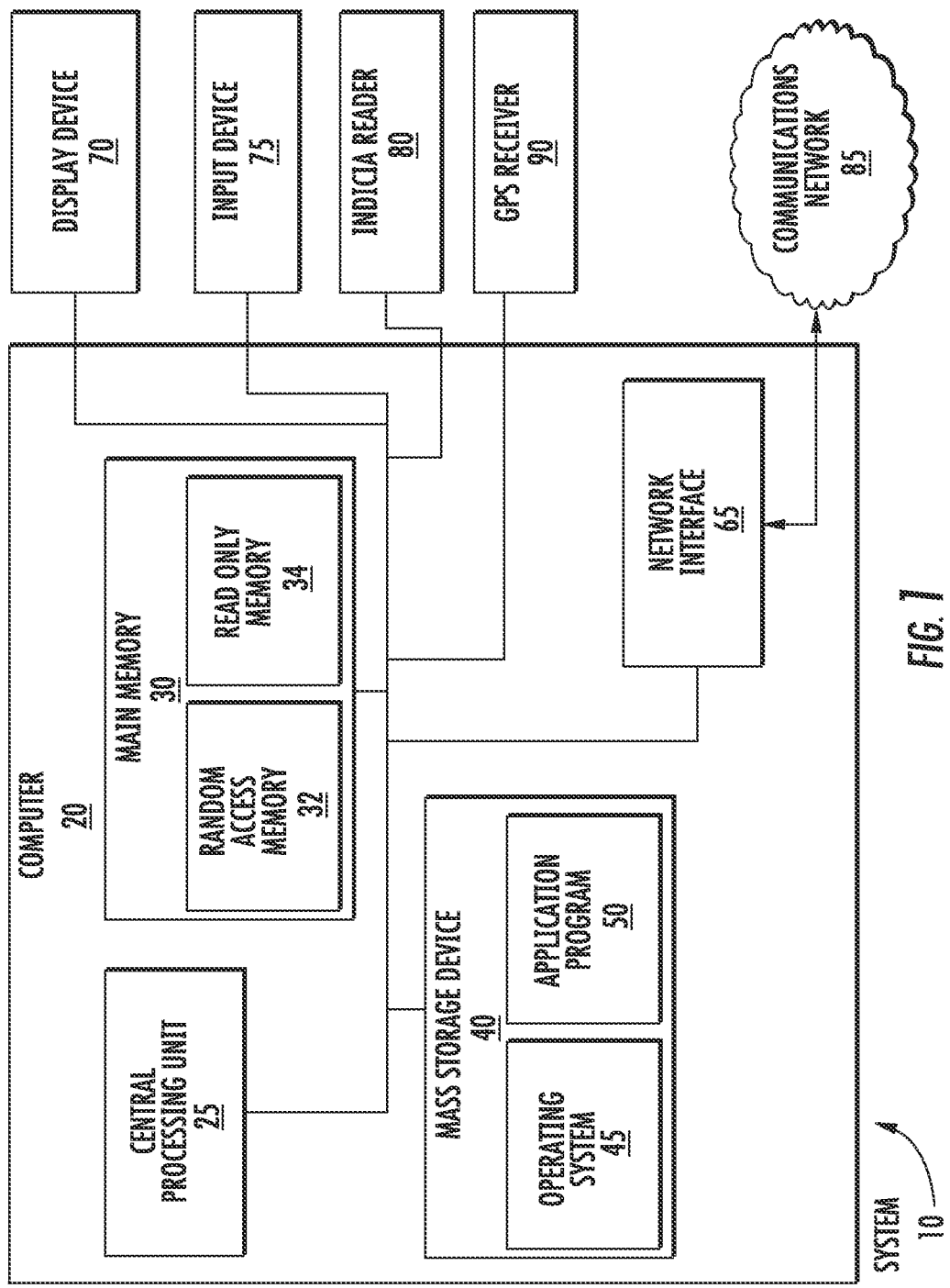
FIG. 1 is a schematic block diagram illustrating components of an exemplary shelving and package locating system for a delivery vehicle according to the present invention.

Referring now to the drawings, FIG. 1 is a schematic block diagram illustrating certain components of an exemplary system 10 for a package-delivery vehicle that allows packages to be easily and quickly located at the time of delivery. Computer 20 includes a mass storage device 40 for storing an operating system 45 and various application programs 50. The mass storage device 40 may store other kinds of information as well.

The operating system 45 includes software that controls the overall operation of the computer 20, including process scheduling and management, process protection, and memory management. Examples of suitable operating systems include, but are not limited to, WINDOWS® 7 and WINDOWS® EMBEDDED COMPACT (i.e., WINDOWS® CE) from MICROSOFT® CORPORATION of Redmond, Wash., and the LINUX® open source operating system. Typically, the operating system 45 is loaded by booting the computer 20 and is executed directly by the central processing unit 25.

Application programs 50 include any number of executable software programs designed to assist the delivery driver in the performance of specific tasks. Application programs 50 may load automatically upon execution of the operating system 45 or in response to an input from the operator.

Main memory 30 provides for the storage of instructions and information directly accessible by central processing unit 25. Main memory 30 may be configured to include random-access memory 32 (RAM) and read-only memory 34 (ROM). The ROM 34 may permanently store firmware or a basic input/output system (BIOS), which provides first instructions to the computer 20 when it is booted. RAM 32 may serve as temporary and immediately accessible storage for the operating system 45 and the application programs 50.

Mass storage device 40 may be any of the various kinds of computer components capable of storing large amounts of data in a persisting (i.e., non-volatile) and machine-readable manner. Mass storage device 40 may be a hard disk, a solid state drive, optical drive, removable flash drive or any other component with similar storage capabilities.

As illustrated at FIG. 1, a display device 70 may be operably connected to the computer 20. The display device 70 may display information to the user in the form of text or graphical output generated by computer 20. Typically, the display device 70 is a liquid crystal display (LCD) screen.

An input device 75 is operably connected to the computer 20. The input device 75 facilitates the input of instructions or information by the user. The input device 75 may be a keyboard and/or a mouse or some other input devices such as a computer touch screen.

An indicia reader 80 (e.g., a laser scanner, image code reader, RFID reader, etc.) is also operably connected to the computer 20 (e.g., via a wireless connection or a corded connection). The indicia reader 80 facilitates the receipt of user input and provides for quick, reliable data entry that is not susceptible to typographical errors.

The term indicia as used herein is intended to refer broadly to various kinds of machine-readable indicia, including barcodes, QR codes, matrix codes, 1D codes, 2D codes, RFID tags, characters, etc. The indicia are typically graphical representations of information (e.g., data) such as product numbers or package tracking numbers.

The computer 20 of the exemplary system 10 also includes a network interface 65. The network interface 65 is logically connected to a communications network 85, thereby enabling the computer 20 to communicate with the communications network 85. The communications network 85 may be any collection of computers or communication devices interconnected by communication channels. The communication channels may be wired or wireless. Examples of such communication networks include, without limitation, local area networks, the Internet, and cellular networks. The connection to the communications network 85 allows the computer 20 to communicate with other network nodes. For example, a central dispatcher can send instructions (e.g., a delivery schedule for items) from a scheduling server to a delivery driver's computer 20 via the communications network 85.

GPS receiver 90 utilizes signals broadcast from satellites to make calculations regarding latitude and longitude. The GPS receiver provides the latitude and longitude information to the central processing unit 25, which is responsible for the processing and storage of the information.

Figure 2:
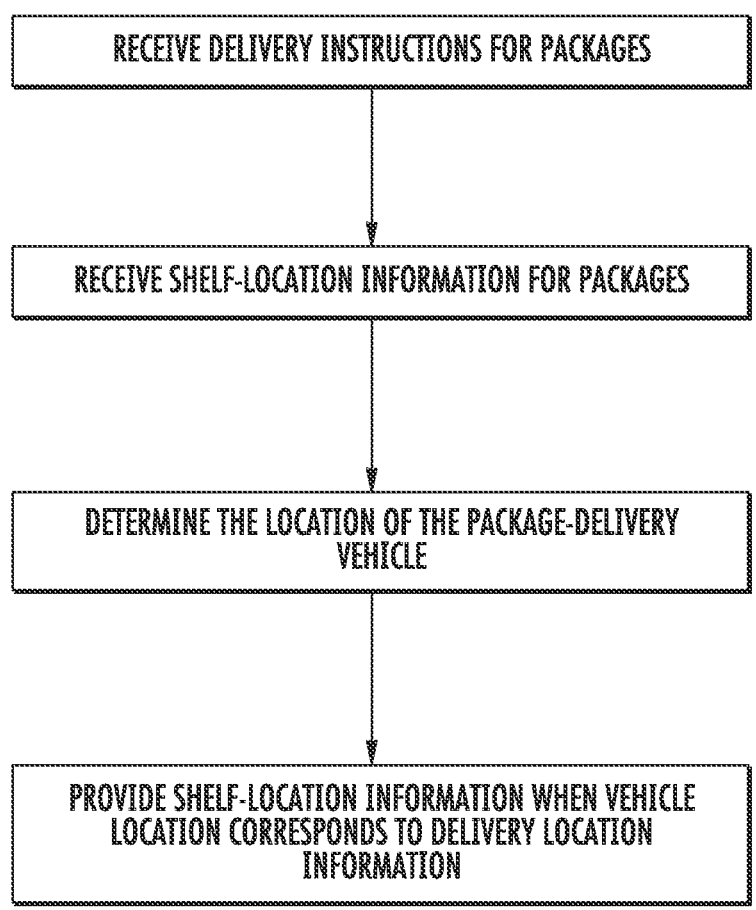
FIG. 2 is a flow chart illustrating the operation of certain elements of an exemplary shelving and package locating system for a delivery vehicle according to the present invention.

FIG. 2 is a flow chart depicting the operation of an exemplary shelving system 10 according to the present invention. The computer's central processing unit 25, along with other components of system 10 (e.g., application programs 50), may be configured to receive and store delivery instructions (e.g., delivery-address information) associated with an item, package, or parcel that is scheduled for delivery.

The items scheduled for delivery can be scanned by indicia reader 80 as the items are loaded onto the delivery vehicle such that identifying information (e.g., product numbers or package tracking numbers) is input into computer 20 and correlated (i.e., associated in memory) with the delivery instructions that have been received for the specific products or packages.

The delivery driver or sorter loading the delivery vehicle can then scan a barcode or otherwise input information into the computer 20 identifying a shelf location (i.e., shelf-location information) as the item or package is placed on each respective shelf. Thus, the computer 20 will acquire delivery instructions relating to an item for delivery as well as the shelf location of the item as it is loaded into the delivery vehicle.

After the delivery instructions have been received and the vehicle has been loaded with the packages or other items, the driver can then begin driving along the delivery route. While the driver is following the delivery route, the GPS receiver 90 relays delivery vehicle location information to the computer 20. When the vehicle's location is within a certain range of the delivery location (e.g., the typical distance of a parking lot to an office building) the system 10 provides shelf-location information prompting the driver to the shelf location of the correct package.

The system 10 may be implemented in a number of ways with various component arrangements (or with fewer individual components). For example, a mobile computer (i.e., a computer within a hand-supportable housing) including components of the system 10 (e.g., a computer, indicia-reading device, and GPS receiver) may be used. The mobile computer equipped with the various components may be a mobile phone (i.e., a smart phone), a tablet, a wearable computer (e.g., a wrist wearable computer, head mounted computer, etc.), or any similar portable electronic device. Similarly, a vehicle-mount computer in operative communication with components that are separate fixtures within the delivery vehicle (e.g., fixed displays, audio indicators, etc.) may be used.

Figure 3:
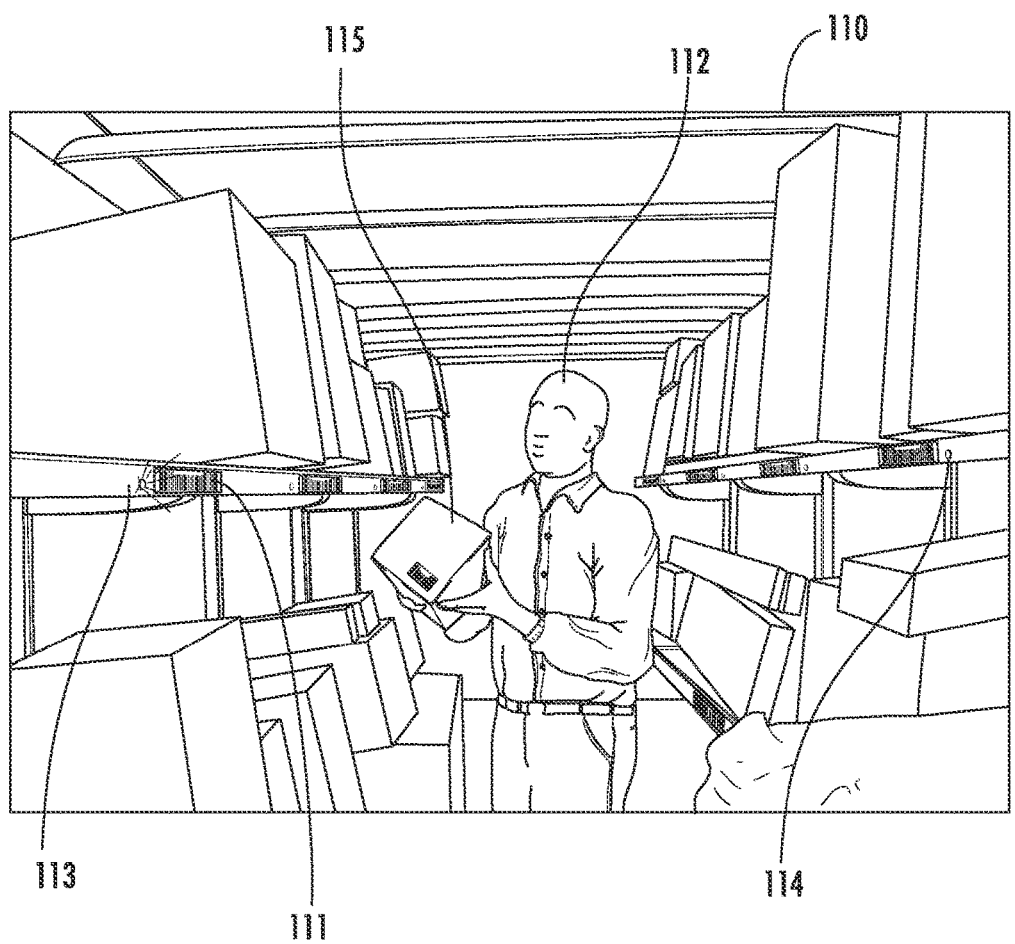
FIG. 3 depicts an exemplary shelving and package locating system for a delivery vehicle according to the present invention.

In one embodiment, the system 10 may alert the driver as to the correct shelf location by way of display device 70. Alternatively, or in addition to location information being shown on display device 70, the respective shelves of the delivery vehicle can be equipped with indicators (e.g., LEDs, electronic ink (E-Ink) displays, etc.) that direct the operator to the appropriate shelf (FIG. 3). The system 10 may also incorporate audible indicators to indicate the location of the correct package for the current delivery stop.

FIG. 3 depicts an embodiment of an exemplary shelving system 110 according to the present invention. The respective shelves 113 contain displays (e.g., E-ink displays) including indicia information 111. In this regard, the delivery driver or sorter 112 can scan the indicia information 111 associated with a shelf location as the item 115 is placed on the shelf 113 so that a computer can correlate the item 115 for delivery with its shelf location. The shelves 113 may also contain indicators 114 (e.g., LEDs) that can be controlled by a computer in order to notify the driver 112 regarding the correct shelf location information based upon the delivery vehicle's location.

In another aspect, the present invention embraces a flexible shelving system for a delivery vehicle that supports holding packages in identifiable locations. The shelving system may also prevent package shifting during transit. An overview of an exemplary flexible shelving system 300 is illustrated at FIG. 4.

Figure 4:
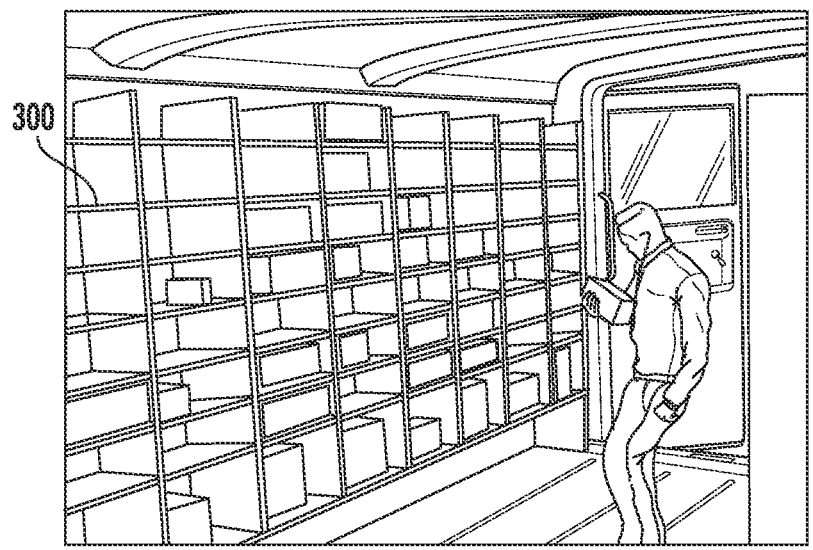
FIG. 4 illustrates an exemplary adjustable shelving system for a delivery vehicle according to the present invention.

Although the exemplary shelving system 300 as shown is in FIG. 4 has a relatively symmetrical configuration, the system 300 may incorporate various aspects that allow the system to accommodate packages of varying sizes and shapes.

Figure 5:
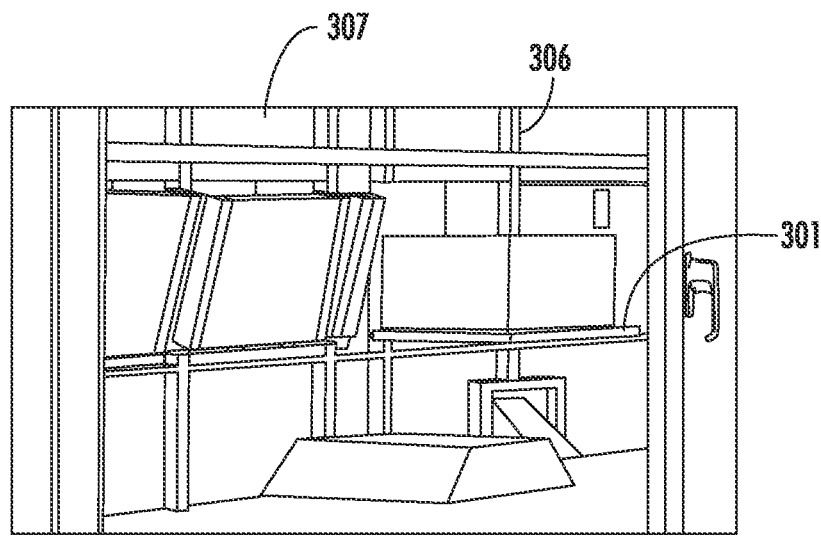
FIG. 5 illustrates one aspect of an exemplary adjustable shelving system for a delivery vehicle according to the present invention.

As illustrated at FIG. 5, the system 300 may include a track system 306 arranged on an inner wall 307 of a delivery vehicle. The track system 306 supports fold-up or fold-down shelf sections 301 (i.e., sections that rotate between a folded up and folded down position) to allow for larger packages or items (e.g., tires) to be loaded onto the vehicle shelves. To provide further flexibility in accommodating items or packages of varying shapes and sizes, the shelves 301 may be adjustable at positions along the track system 306.

Figure 6:
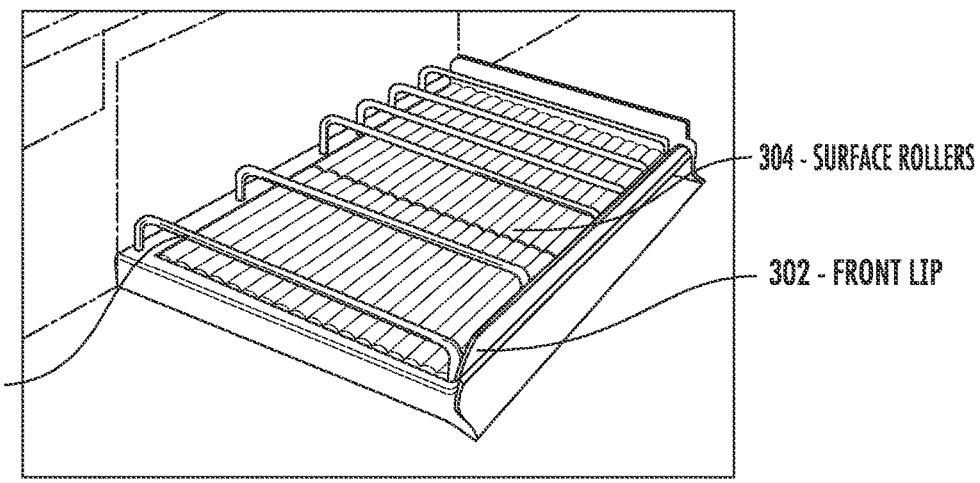
FIG. 6 illustrates another aspect of an exemplary adjustable shelving system for a delivery vehicle according to the present invention.

Not only may the system 300 be adjustable to hold packages of varying sizes and shapes, the system 300 may also be designed to securely hold packages when in transit. As illustrated at FIG. 6, the system 300 may incorporate a retainer ridge (i.e., a lip) 302 on the front of the shelves to prevent packages from sliding forward and off of the shelves.

Dividers 303 may be used in to order subdivide the shelves into sections and to hold the packages or parcels in place. Surface rollers 304 (i.e., shafts configured to rotate) may be included within the surface of the shelves in order to facilitate loading and unloading the packages or parcels as the items are being placed onto or removed from the shelves.

Figure 7:
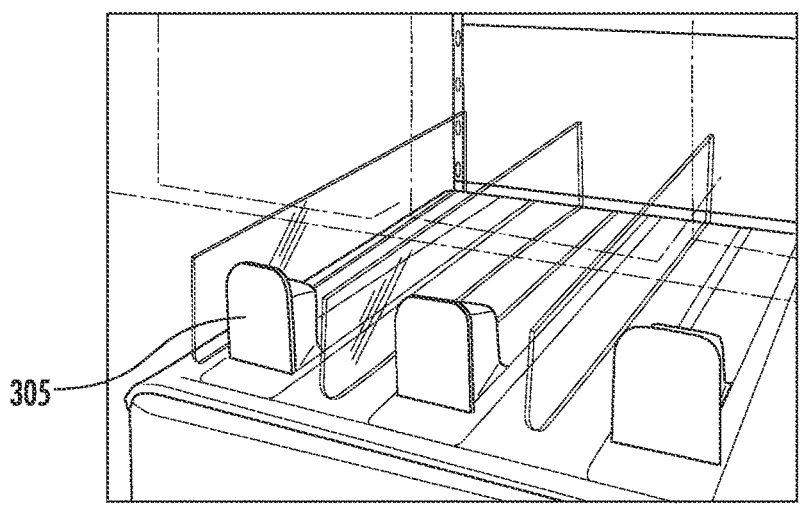
FIG. 7 illustrates yet another aspect of an exemplary adjustable shelving system for a delivery vehicle according to the present invention.

Another aspect of the system 300 that may be incorporated to prevent packages from shifting is illustrated at FIG. 7. The system 300 may include a spring loaded or push feed design 305 that applies forward pressure to the packages to keep the packages secure and easy to access. The spring loaded push feature may also be applied from a vertical direction for greater stability (not explicitly shown).

As described previously with reference to FIG. 3, each shelf or bin of shelving system 300 can be provided with shelf-locator indicators (e.g., labels, bar codes, LEDs, or E-ink displays). Similarly, package-locator indicators may be provided (e.g., LEDs, E-ink displays, or audible indicators). The shelf-locator and package-locator indicators may be utilized to input shelf-location information into system 10 and to notify a delivery driver regarding the correct shelf location of a package when at a delivery stop.

To supplement the present disclosure, this application incorporates entirely by reference the following patents, patent application publications, and patent applications: U.S. Pat. No. 6,832,725; U.S. Pat. No. 7,128,266; U.S. Pat. No. 7,159,783; U.S. Pat. No. 7,413,127; U.S. Pat. No. 7,726,575; U.S. Pat. No. 8,294,969; U.S. Pat. No. 8,317,105; U.S. Pat.

No. 8,322,622; U.S. Pat. No. 8,366,005; U.S. Pat. No. 8,371,507; U.S. Pat. No. 8,376,233; U.S. Pat. No. 8,381,979; U.S. Pat. No. 8,390,909; U.S. Pat. No. 8,408,464; U.S. Pat. No. 8,408,468; U.S. Pat. No. 8,408,469; U.S. Pat. No. 8,424,768; U.S. Pat. No. 8,448,863; U.S. Pat. No. 8,457,013; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,523,076; U.S. Pat. No. 8,528,819; U.S. Pat. No. 8,544,737; U.S. Pat. No. 8,548,242; U.S. Pat. No. 8,548,420; U.S. Pat. No. 8,550,335; U.S. Pat. No. 8,550,354; U.S. Pat. No. 8,550,357; U.S. Pat. No. 8,556,174; U.S. Pat. No. 8,556,176; U.S. Pat. No. 8,556,177; U.S. Pat. No. 8,559,767; U.S. Pat. No. 8,559,957; U.S. Pat. No. 8,561,895; U.S. Pat. No. 8,561,903; U.S. Pat. No. 8,561,905; U.S. Pat. No. 8,565,107; U.S. Pat. No. 8,571,307; U.S. Pat. No. 8,579,200; U.S. Pat. No. 8,583,924; U.S. Pat. No. 8,584,945; U.S. Pat. No. 8,587,595; U.S. Pat. No. 8,587,697; U.S. Pat. No. 8,588,869; U.S. Pat. No. 8,590,789; U.S. Pat. No. 8,593,539; U.S. Pat. No. 8,596,542; U.S. Pat. No. 8,596,543; U.S. Pat. No. 8,599,271; U.S. Pat. No. 8,599,957; U.S. Pat. No. 8,600,158; U.S. Pat. No. 8,600,167; U.S. Pat. No. 8,602,309; U.S. Pat. No. 8,608,053; U.S. Pat. No. 8,608,071; U.S. Pat. No. 8,611,309; U.S. Pat. No. 8,615,487; U.S. Pat. No. 8,616,454; U.S. Pat. No. 8,621,123; U.S. Pat. No. 8,622,303; U.S. Pat. No. 8,628,013; U.S. Pat. No. 8,628,015; U.S. Pat. No. 8,628,016; U.S. Pat. No. 8,629,926; U.S. Pat. No. 8,630,491; U.S. Pat. No. 8,635,309; International Publication No. 2013/163789; International Publication No. 2013/173985; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0225757; U.S. Patent Application Publication No. 2011/0169999; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193407; U.S. Patent Application Publication No. 2012/0193423; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0056285; U.S. Patent Application Publication No. 2013/0068840; U.S. Patent Application Publication No. 2013/0070322; U.S. Patent Application Publication No. 2013/0075168; U.S. Patent Application Publication No. 2013/0082104; U.S. Patent Application Publication No. 2013/0175341 U.S. Patent Application Publication No. 2013/0175343; U.S. Patent Application Publication No. 2013/0200158; U.S. Patent Application Publication No. 2013/0256418; U.S. Patent Application Publication No. 2013/0257744; U.S. Patent Application Publication No. 2013/0257759; U.S. Patent Application Publication No. 2013/0270346; U.S. Patent Application Publication No. 2013/0278425; U.S. Patent Application Publication No. 2013/0287258; U.S. Patent Application Publication No. 2013/0292474; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306730; U.S. Patent Application Publication No. 2013/0306731; U.S. Patent Application Publication No. 2013/0306734; U.S. Patent Application Publication No. 2013/0307964; U.S. Patent Application Publication No. 2013/0313324; U.S. Patent Application Publication No. 2013/0313325; U.S. Patent Application Publication No. 2013/0313326; U.S. Patent Application Publication No. 2013/0327834; U.S. Patent Application Publication No. 2013/0341399; U.S. Patent Application Publication No. 2013/0342717; U.S. Patent Application Publication No. 2014/0001267; U.S. Patent Application Publication No. 2014/0002828; U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/736,139 for an Electronic Device Enclosure, filed Jan. 8, 2013 (Chaney); U.S. patent application Ser. No. 13/750,304 for Measuring Object Dimensions Using Mobile Computer, filed Jan. 25, 2013; U.S. patent application Ser. No. 13/771,508 for an Optical Redirection Adapter, filed Feb. 20, 2013 (Anderson); U.S. patent application Ser. No. 13/780,158 for a Distraction Avoidance System, filed Feb. 28, 2013 (Sauerwein); U.S. patent application Ser. No. 13/780,196 for Android Bound Service Camera Initialization, filed Feb. 28, 2013 (Todeschini et al.); U.S. patent application Ser. No. 13/780,271 for a Vehicle Computer System with Transparent Display, filed Feb. 28, 2013 (Fitch et al.); U.S. patent application Ser. No. 13/780,356 for a Mobile Device Having Object-Identification Interface, filed Feb. 28, 2013 (Samek et al.); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/792,322 for a Replaceable Connector, filed Mar. 11, 2013 (Skvoretz); U.S. patent application Ser. No. 13/852,097 for a System and Method for Capturing and Preserving Vehicle Event Data, filed Mar. 28, 2013 (Barker et al.); U.S. patent application Ser. No. 13/885,218 for a Indicia Encoding System with Integrated Purchase and Payment Information, filed Oct. 6, 2013 (Liu et al.); U.S. patent application Ser. No. 13/895,846 for a Method of Programming a Symbol Reading System, filed Apr. 10, 2013 (Corcoran); U.S. patent application Ser. No. 13/902,110 for a System and Method for Display of Information Using a Vehicle-Mount Computer, filed May 24, 2013 (Hollifield); U.S. patent application Ser. No. 13/902,144, for a System and Method for Display of Information Using a Vehicle-Mount Computer, filed May 24, 2013 (Chamberlin); U.S. patent application Ser. No. 13/902,242 for a System For Providing A Continuous Communication Link With A Symbol Reading Device, filed May 24, 2013 (Smith et al.); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini); U.S. patent application Ser. No. 14/047,896 for Terminal Having Illumination and Exposure Control filed Oct. 7, 2013 (Jovanovski et al.) U.S. patent application Ser. No. 14/058,721 for a Terminal Configurable for Use Within an Unknown Regulatory Domain, filed Oct. 21, 2013 (Pease et al.); U.S. patent application Ser. No. 14/035,474 for Augmented-Reality Signature Capture, filed Sep. 24, 2013 (Todeschini); U.S. patent application Ser. No. 14/050,515 for Hybrid-Type Bioptical, filed Oct. 10, 2013 (Edmonds et al.); U.S. patent application Ser. No. 14/053,175 for Imaging Apparatus Having Imaging Assembly, filed Oct. 14, 2013; U.S. patent application Ser. No. 14/055,234 for Dimensioning System, filed Oct. 16, 2013 (Fletcher); U.S. patent application Ser. No. 14/055,353 for Dimensioning System, filed Oct. 16, 2013 (Giordano et al.); U.S. patent application Ser. No. 14/055,383 for Dimensioning System, filed Oct. 16, 2013 (Li et al.); U.S. patent application Ser. No. 14/050,675 for Apparatus for Displaying Bar Codes from Light Emitting Display Surfaces, filed Oct. 10, 2013 (Horn et al.); U.S. patent application Ser. No. 14/053,314 for Indicia Reader, filed Oct. 14, 2013 (Huck); U.S. patent application Ser. No. 14/058,762 for Terminal Including Imaging Assembly, filed Oct. 21, 2013 (Gomez et al.); U.S. patent application Ser. No. 14/058,831 for System Operative to Adaptively Select an Image Sensor for Decodable Indicia Reading, filed Oct. 21, 2013 (Sauerwein); U.S. patent application Ser. No. 14/062,239 for Chip on Board Based Highly Integrated Imager, filed Oct. 24, 2013 (Toa et al.); U.S. patent application Ser. No. 14/065,768 for Hybrid System and Method for Reading Indicia, filed Oct. 29, 2013 (Meier et al.); U.S. patent application Ser. No. 14/074,746 for Self-Checkout Shopping System, filed Nov. 8, 2013 (Hejl et al.); U.S. patent application Ser. No. 14/074,787 for Method and System for Configuring Mobile Devices via NFC Technology, filed Nov. 8, 2013 (Smith et al.); U.S. patent application Ser. No. 14/082,379 for Method and Apparatus for Compensating Pixel Values in an Imaging, filed Nov. 18, 2013 (Hussey et al.); U.S. patent application Ser. No. 14/082,468 for Encoded Information Reading Terminal with Wireless Path Selection Capability, filed Nov. 18, 2013 (Wang et al.); U.S. patent application Ser. No. 14/082,551 for Power Management Scheme for Portable Data Collection Devices Utilizing Location and Position Sensors, filed Nov. 18, 2013 (Sauerwein et al.); U.S. patent application Ser. No. 14/087,007 for Scanner with Wake-Up Mode, filed Nov. 22, 2013 (Nahill et al.); U.S. patent application Ser. No. 14/087,190 for Optimal Range Indicators for Bar Code Validation, filed Nov. 22, 2013 (Hejl); U.S. patent application Ser. No. 14/093,484 for System for Capturing a Document in an Image Signal, filed Dec. 1, 2013 (Showering); U.S. patent application Ser. No. 14/093,487 for Method and System Operative to Process Color Image Data, filed Dec. 1, 2013 (Li et al.); U.S. patent application Ser. No. 14/093,490 for Imaging Terminal Having Image Sensor and Lens Assembly, filed Dec. 1, 2013 (Havens et al.); U.S. patent application Ser. No. 14/093,624 for Apparatus Operative for Capture of Image Data, filed Dec. 2, 2013 (Havens et al.); U.S. patent application Ser. No. 14/094,087 for Method and System for Communicating Information in an Digital Signal, filed Dec. 2, 2013 (Peake et al.); U.S. patent application Ser. No. 14/101,965 for High Dynamic-Range Indicia Reading System, filed Dec. 10, 2013 (Xian); U.S. patent application Ser. No. 14/107,048 for Roaming Encoded Information Reading Terminal, filed Dec. 16, 2013 (Wang et al.); U.S. patent application Ser. No. 14/118,400 for Indicia Decoding Device with Security Lock, filed Nov. 18, 2013 (Liu); U.S. patent application Ser. No. 14/138,206 for System and Method to Store and Retrieve Identifier Associated Information, filed Dec. 23, 2013 (Gomez et al.); U.S. patent application Ser. No. 14/143,399 for Device Management Using Virtual Interfaces, filed Dec. 30, 2013 (Caballero).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:
1. A delivery-vehicle shelving system, comprising:
   a vehicle for transporting packages;
   one or more shelves within the vehicle for storing the packages during delivery, each package associated with corresponding delivery-location information, the one or more shelves having indicators comprising a light source and bearing decodable indicia corresponding to respective locations on the one or more shelves;
   an indicia-reading device for (i) scanning the packages that are loaded onto the one or more shelves, (ii) scanning the decodable indicia to associate each package with the package's shelf location on the one or more shelves wherein the shelf location is coded within the decodable indicia, (iii) transmitting the corresponding package shelf location information, and (iv) transmitting the corresponding package delivery-location information;
   a GPS receiver for detecting a location of the vehicle and transmitting corresponding vehicle-location information; and
   a computer in communication with the indicia-reading device and the GPS receiver, the computer including a central processing unit and memory;

wherein the computer's central processing unit is configured to receive (i) the package shelf location information for the packages that have been loaded onto the vehicle from the indicia-reading device, (ii) the delivery-location information for the packages that have been loaded onto the vehicle from the indicia-reading device, and (iii) the vehicle-location information from the GPS receiver;

wherein, in response to receiving the vehicle-location information, the central processing unit is configured to identify the package shelf location information for one of the packages when that package's delivery-location information is within a predetermined geographic range of the vehicle-location information received; and wherein the central processing unit is configured to provide a prompt comprising the identified package shelf location information to a driver of the vehicle via, at least, the indicators.

2. The system of claim 1, wherein the computer, indicia-reading device, and the GPS receiver are enclosed within a hand-supportable housing.

3. The system of claim 1, wherein the computer comprises a network interface.

4. The system of claim 3, wherein the computer is configured to receive delivery route data.

5. The system of claim 1, wherein the vehicle-provided information is delivery route information.

6. The system of claim 1, wherein the light source comprises a LED light source.

7. The system of claim 1, wherein the decodable indicia corresponding to respective locations on the one or more shelves comprise E-Ink displays.

8. The system of claim 1, wherein the prompt to the driver comprises audibly indicating the shelf location.

9. A shelving system for a package-delivery vehicle, comprising:

a plurality of shelves for storing packages during delivery to respective geographic locations, each package being associated with corresponding delivery-location information, the plurality of shelves having indicators comprising a light source and bearing decodable indicia corresponding to respective locations on the one or more shelves;

an indicia-reading device for (i) scanning the packages that are loaded onto the plurality of shelves, (ii) scanning the decodable indicia to associate each loaded package with its shelf location wherein the shelf location is coded within the decodable indicia, (iii) transmitting the corresponding shelf-location information, and (iv) transmitting the corresponding delivery-location information;

a GPS receiver for (i) determining a location of the package-delivery vehicle and (ii) transmitting the corresponding vehicle-location information; and a computer in communication with the indicia-reading device and the GPS receiver, the computer including a central processing unit and a memory;

wherein the computer's central processing unit is configured to receive (i) the shelf-location information and delivery-location information from the indicia-reading device for the packages that have been loaded onto the plurality of shelves, and (ii) the vehicle-location information from the GPS receiver;

wherein the computer's central processing unit is configured to analyze (i) the vehicle-location information, (ii) the delivery-location information, and (iii) the shelf-location information; and wherein, the central processing unit is configured to provide, based upon the results of the analysis and via the indicators, the shelf location of a package when that package's delivery-location information is within a predetermined geographic range of the vehicle-location information.

10. The shelving system according to claim 9, comprising a visual display in communication with the computer, wherein the central processing unit is further configured to indicate the shelf location of the package via the visual display when that package's delivery-location information corresponds with the vehicle-location information.

11. The shelving system according to claim 10, comprising an audio device in communication with the computer, wherein the central processing unit is further configured to indicate the shelf location of the package via the audio device when that package's delivery-location information corresponds with the vehicle-location information.

12. A package delivery system, comprising:

a vehicle for transporting packages;

one or more areas within the vehicle for storing the packages during transport, each package associated with corresponding delivery-location information, the one or more areas having indicators comprising a light source and bearing decodable indicia corresponding to respective locations on the one or more areas;

an indicia-reading device configured for scanning the packages that are loaded onto the one or more areas, scanning the decodable indicia to associate each package with the package's area location on the one or more areas wherein the area location is coded within the decodable indicia, transmitting the corresponding package area location information, and transmitting the corresponding delivery-location information;

a GPS receiver for transmitting location information relating to the vehicle; and a computer in communication with the indicia-reading device and the GPS receiver, the computer configured to identify, via the indicators, one of the package area locations when the delivery-location information for one of the packages is within a predetermined geographic range of the vehicle location information, wherein the identification is based on (i) the area location information received from the indicia-reading device for the one of the packages, (ii) the delivery-location information received from the indicia-reading device for the one of the packages, and (iii) the vehicle location information received from the GPS receiver.

13. The system of claim 12, wherein:

the computer comprises a network interface;

the computer is configured to receive delivery route data relating to the packages via the network interface; and the computer is configured to identify the one of the package area locations based further upon the one of the package's delivery-location information corresponding with the vehicle-location information.

14. The system of claim 13, wherein the computer, the indicia-reading device, and the GPS receiver are enclosed within a hand-supportable housing.

15. The system of claim 14, wherein the computer is configured to provide an audible prompt comprising the identified one of the package area locations.

* * * * *